United States Patent [19]

Seki et al.

[11] Patent Number: 4,855,927
[45] Date of Patent: Aug. 8, 1989

[54] COMPLEX CURVED SURFACE CREATION METHOD

[75] Inventors: Masaki Seki; Norihisa Amano, both of Tokyo, Japan

[73] Assignee: Fanuc Ltd, Minamitsuru, Japan

[21] Appl. No.: 36,680

[22] PCT Filed: Jul. 18, 1986

[86] PCT No.: PCT/JP86/00374
§ 371 Date: Mar. 16, 1987
§ 102(e) Date: Mar. 16, 1987

[87] PCT Pub. No.: WO87/00651
PCT Pub. Date: Jan. 29, 1987

[30] Foreign Application Priority Data

Jul. 18, 1985 [JP] Japan .................................. 60-158583

[51] Int. Cl.[4] .............................................. G06F 15/46
[52] U.S. Cl. ........................... 364/474.29; 364/424.25
[58] Field of Search ................................ 364/167–171, 364/191–193, 474, 475; 318/568

[56] References Cited

U.S. PATENT DOCUMENTS

| | | | |
|---|---|---|---|
| 4,491,906 | 1/1985 | Kishi et al. | 364/191 |
| 4,523,270 | 6/1985 | Kishi et al. | 364/191 |
| 4,546,427 | 10/1985 | Kishi et al. | 364/168 |
| 4,569,014 | 2/1986 | Kishi et al. | 364/191 |
| 4,589,062 | 5/1986 | Kishi et al. | 364/168 |

Primary Examiner—John R. Lastova
Attorney, Agent, or Firm—Staas & Halsey

[57] ABSTRACT

The invention relates to a method of creating a complex curved surface (CPS) comprising at least two three-dimensional curved surfaces (10a, 10b), particularly a method of creating a complex curved surface in which roundness is provided at a portion where first and second curved surfaces intersect. In the curved surface creation method, rounding is performed by obtaining normal vectors $V_1$, $V_2$ of first and second curved surfaces (10a, 10b) at a point of intersection $P_0$ of first and second section curves (11, 12) obtained when the first and second curved surfaces are cut by a section (13) perpendicular to the XY plane, calculating an angle $\theta$ defined by $V_1 \times V_2$ and a normal vector $v$ of the section (13), calculating $R'$ in accordance with the equation $$R' = (1 + 1/|\cos\theta|) \cdot R/2$$

when roundness of radius R is commanded, and inserting a circular arc of radius $R'$ at the portion where the first and second curved surfaces intersect. $R'$ is the average value of the major axis ($= R/|\cos\theta|$) and minor axis ($= R$) of an ellipse.

4 Claims, 10 Drawing Sheets

COMPLEX CURVED SURFACE CREATION METHOD

BACKGROUND OF THE INVENTION

1. Field of the Invention

This invention relates to a method of generating a complex curved surface comprising at least two three-dimensional curved surfaces, and more particularly, to a complex curved surface creation method for generating a complex curved surface in which a predetermined roundness is provided at a portion where first and second three-dimensional curved surfaces intersect.

2. Description of the Related Art

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, there has been developed and put into practical use a method comprising generating a plurality of intermediate sections in accordance with predetermined rules using data specifying several sections and section curves of a three-dimensional curved body, finding a section curve (intermediate section curve) on the curved body based on the intermediate sections, and generating a curved surface of the three-dimensional body based on the plurality of generated intermediate section curves. For example, see the specification of Japanese Patent Application Laid-Open No. 57-5109 (corresponding to U.S. Pat. No. 4,491,906), and "Introduction to NC Programming", published by Nikkan Kogyo Shimbunsha, Oct. 30, 1981, pp. 156-162. This method is useful in generating a smooth curved surface from section data.

Depending upon machining, there are cases where it is required to machine a complex curved surface obtained by combining two or more three-dimensional curved surfaces, or in other words, to create a complex curved surface. However, it is not possible with the prior art to create a complex curved surface in simple manner by combining these three-dimensional curved surfaces using the data indicative of each three-dimensional curved surface. Accordingly, the applicant has proposed in Japanese Patent Application No. 60-39445 a novel method of creating complex curved surfaces includes inputting data for specifying each three-dimensional curved surface constituting a complex curved surface, inputting data specifying one line of intersection on a predetermined plane (e.g. the X-Y plane) as well as a rule for specifying a number of lines of intersection on the X-Y plane on the basis of said line of intersection, finding a section curve of the complex surface based on a section which has an i-th line of intersection, among the number of lines of intersection, as its line of intersection with the X-Y plane, thereafter obtaining, in a similar manner, section curves based on sections corresponding to respective ones of the lines of intersection, and generating a complex curved surface by assembling the section curves.

There are cases where it is desired to provide a fillet surface (i.e. a rounded surface) of a radius R at the boundaries of the three-dimensional curved surfaces constituting the complex curved surface.

Conventionally, however, these boundaries cannot be provided with roundness of radius R accurately through a simple method. It should be noted that the applicant has proposed a method of providing roundness in International Application No. PCT/JP86/00310.

SUMMARY OF THE INVENTION

Accordingly, an object or the present invention is to provide a complex curved surface creation method whereby a desired fillet surface can be simply and accurately inserted at the boundary of a three-dimensional curved surface constituting a complex curved surface.

The present invention relates to a method of creating a complex curved surface comprising at least two three-dimensional curved surfaces, particularly a method of creating a complex curved surface in which roundness is provided at a portion where first and second curved surfaces intersect.

In the curved surface creation method, rounding is performed by obtaining normal vectors $V_1$, $V_2$ of first and second curved surfaces at a point of intersection $P_0$ of first and second section curves obtained when the first and second curved surfaces are cut by a section perpendicular to the XY plane, calculating an angle $\theta$ defined by $V_1 \times V_2$ and a normal vector $V$ of the section, calculating $R'$ in accordance with the equation $$R' = (1 + 1/|\cos\theta|) R/2$$

when roundness of radius R is commanded, and inserting a circular arc of radius $R'$ at the portion where the first and second curved surfaces intersect. It should be noted that $R'$ is the average value of the major axis $(= R/|\cos\theta|)$ and minor axis $(= R)$ of an ellipse.

DESCRIPTION OF THE PREFERRED EMBODIMENTS

FIG. 1 is a view for describing the present invention. In the Figure, CPS represents a complex curved surface. Numerals 10a, 10b denote first and second curved surfaces constituting the complex curved surface CPS, and 11, 12 first and second section curves obtained when the first and second curved surfaces are cut by a section 13 perpendicular to the XY plane. $P_0$ designates a point of intersection between the first and second section curves, CRL a line of intersection between the first and second section curves 11, 12, $V_1$ a normal vector of the first curved surface 10a at the point of intersection $P_0$, $V_2$ a normal vector of the second curved surface 10b at the point of intersection $P_0$, and V a normal vector of the section 13 perpendicular to the XY plane cutting the complex curved surface CPS.

Figure 1A:
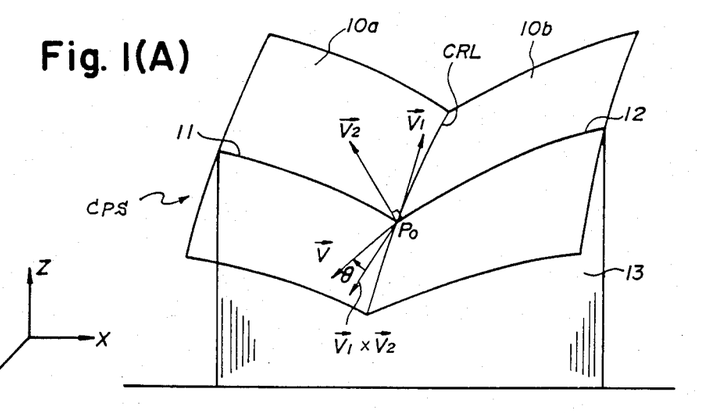
FIGS. 1A-1C are explanatory views of the present invention.
Figure 1B:
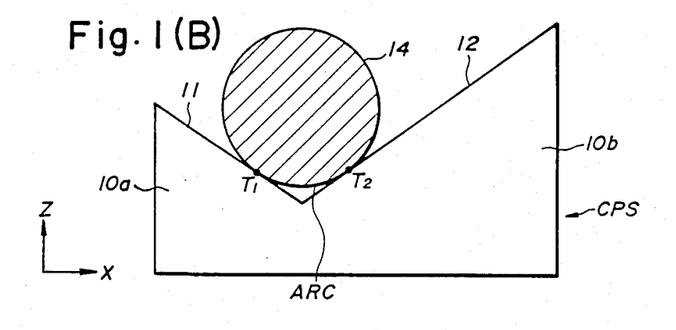

If the line of intersection CRL between the first and second curved surfaces 10a, 10b constituting the complex curved surface CPS lies on a plane parallel to the XY plane, a circular cylinder of radius R is disposed along the line of intersection and the complex curved surface and cylinder are cut by a section perpendicular to both the XY plane and line of intersection CRL, the sectional face 14 of the circular cylinder will be a true circle [see FIG. 1(B)]. Accordingly, if it is desired to insert roundness of radius R at this portion of intersection, (a) a tool is moved along the first curve 11 to a first point of tangency $T_1$ with the circular cylinder;

(b) the tool is then moved on the circular cylinder along a circular arc ARC from the first point of tangency $T_1$ to a second point of tangency $T_2$; and (c) the tool is finally moved along the second curve 12 from the second point of tangency $T_2$.

Figure 1C:
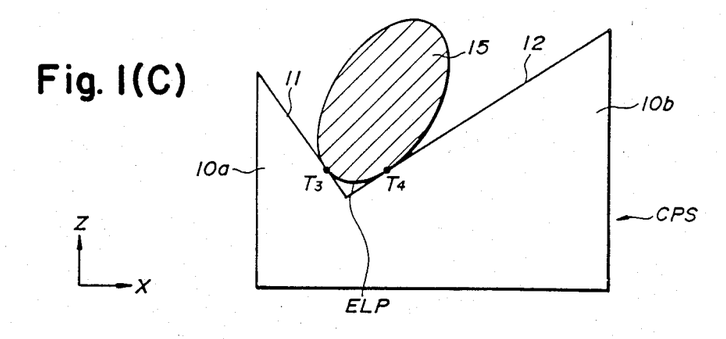

If the line of intersection is not parallel to the XY plane, the circular cylinder will be cut obliquely when cut by the section perpendicular to the XY plane. Consequently, the sectional face 14 of the circular cylinder will be an ellipse and not a true circle [see FIG. 1(C)]. Accordingly, if it is desired to insert roundness of radius R at this portion of intersection, (a) the tool is moved along the first curve 11 to a first point of tangency $T_3$ with the circular cylinder;

(b) the tool is then moved along the outer form ELP of the ellipse from the first point of tangency $T_3$ to a second point of tangency $T_4$; and (c) the tool is finally moved along the second curve 12 from the second point of tangency $T_4$. However, since control for moving the tool along the outer form ELP of the ellipse is difficult, approximation is used in the present invention. Specifically, the invention includes the following steps:

(1) Letting $P_0$ represent a point of intersection of the first and second section curves 11a, 11b obtained when the first and second curved surfaces 10a, 10b are cut by the section 13 [FIG. 1(A)] perpendicular to the XY plane, normal vectors $V_1$, $V_2$ of the first and second curved surfaces at the point of intersection $P_0$ are obtained.

(2) Next, the slope of the line of intersection is obtained by calculating an angle $\theta$ defined by $V_1 \times V_2$ and a normal vector V of the section.

(3) Thereafter, if rounding at radius R is required, R' is calculated in accordance with the equation $$R' = (1 + 1/|\cos \theta|) \cdot R/2$$

using the angle $\theta$, and a circular arc of radius R' is inserted at the portion of intersection.

Thus, according to the present invention, the circular arc of radius R is inserted, in accordance with the command, at the portion of intersection when the line of intersection CRL is parallel to the XY plane ($\theta = 0$). If the line of intersection is not parallel to the XY plane, then a circular arc is inserted having a radius which is the average value of the major axis ($=R/|\cos \theta|$) and minor axis ($=R$) of the ellipse.

Figure 2:
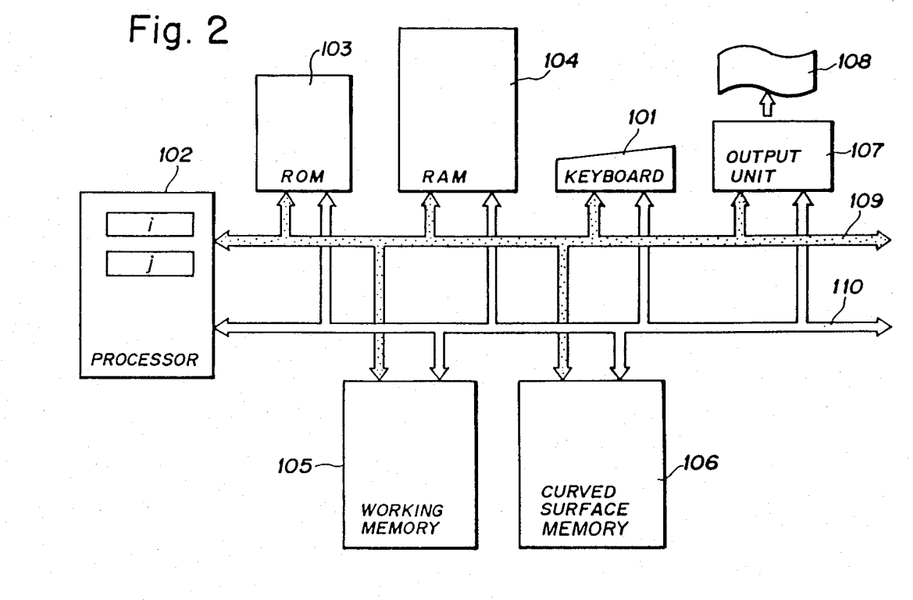
FIG. 2 is a block diagram of a curved surface creation apparatus for realizing the present invention.

FIG. 2 is a block diagram of an automatic programming apparatus for realizing the method of the present invention. Numeral 101 denotes a keyboard for data input; 102 a processor; 103 a ROM storing a control program; 104 a RAM; and 105 a working memory. Numeral 106 designates a curved surface memory for storing curved surface data indicative of a generated complex curved surface as well as NC program data for curved surface machining; 107 an output unit for outputting curved surface data indicative of a generated complex curved surface or NC program data for curved surface machining to an external storage medium 108 such as a paper tape or magnetic tape; 109 an address bus; and 110 a data bus.

A method of creating a complex curved surface in accordance with the present invention will now be described. In the method described, first a complex curved surface in which a boundary does not have a fillet surface will be generated, then a fillet surface will be inserted at the boundary.

Figure 3A:
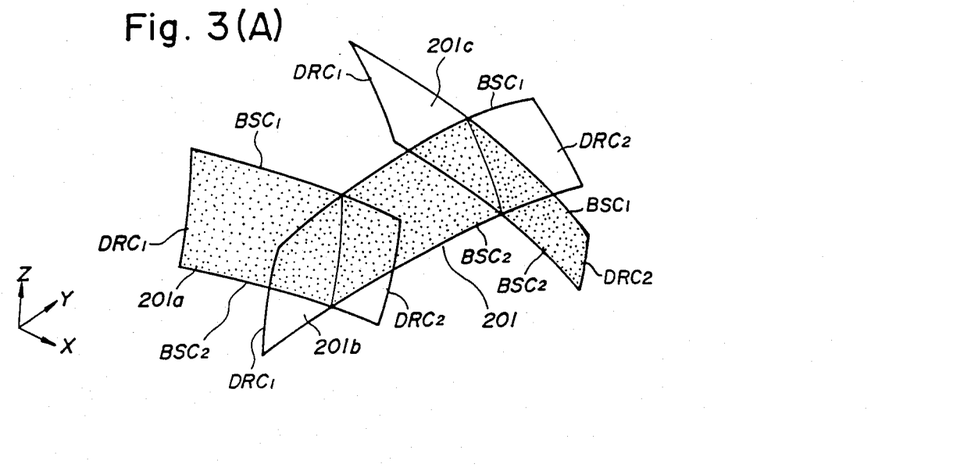
FIGS. 3a-c, 4a-c, 5 and 6 are views for describing complex curved surface creation processing.

(A) Complex curved surface creation processing (a) First, data are entered from the keyboard 101 specifying a first three-dimensional curved surface 201a, a second three-dimensional curved surface 201b, a third three-dimensional curved surface 201c . . . constituting a complex curved surface 201 [see (A) of FIG. 3]. In addition, a starting curved surface (assumed to be the first three-dimensional curved surface) is designated as well as the order in which the curved surfaces are combined (the order is assumed here to be the first curved surface, the second curved surface, the third curved surface, . . . , and so on), this being necessary in generating the complex curved surface. These inputted data are stored in the RAM 104 (FIG. 2). Each of the three-dimensional curved surfaces 201a–201g is specified by two operating curves DRC1, DRC2 and two base curves BSC1, BSC2, etc. Accordingly, each of the three-dimensional curved surfaces is specified by entry of these curve data and the like (see U.S. Pat. No. 4,491,906).

(b) Next, data are inputted from the keyboard 101 for specifying a number of sections perpendicular to the X-Y plane, which cuts the complex curved surface 201, and these data are stored in the RAM 104. More specifically, a single line of intersection on the X-Y plane is inputted, as well as a rule for specifying a number of lines of intersection on the X-Y plane on the basis of the single line of intersection.

Figure 4A:
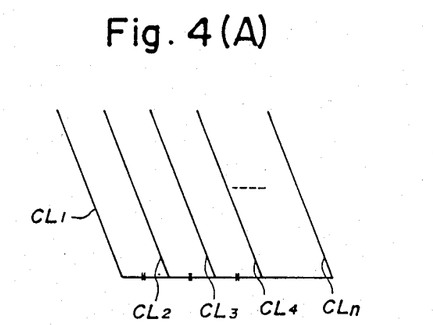

By way of example, in a case where the sections are parallel to one another and perpendicular to the X-Y plane and, moreover, the spacing between adjacent sections is constant, the line of intersection $CL_i (i=1, 2, 3, \ldots)$ between each section and the X-Y plane is as shown in FIG. 4(A). In such case, therefore, data specifying the first line of intersection $CL_1$, as well as the distance between two adjacent lines of intersection (either the distance along the X axis or the distance along the Y axis will suffice), are inputted.

Figure 4B:
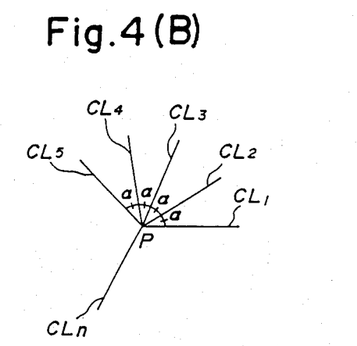

In a case where the sections intersect one another in a straight line perpendicular to the X-Y plane and, moreover, the angles between adjacent sections are constant, lines of intersection $CL_i (i=1, 2, 3, \ldots)$ between the sections and the X-Y plane intersect successively at equal angles at a single point P, as shown in FIG. 4(B). In such case, therefore, data are inputted specifying the first line of intersection $CL_1$ and the point P, and an angle $\alpha$ defined by two mutually adjacent lines of intersection is also inputted.

Figure 3B:
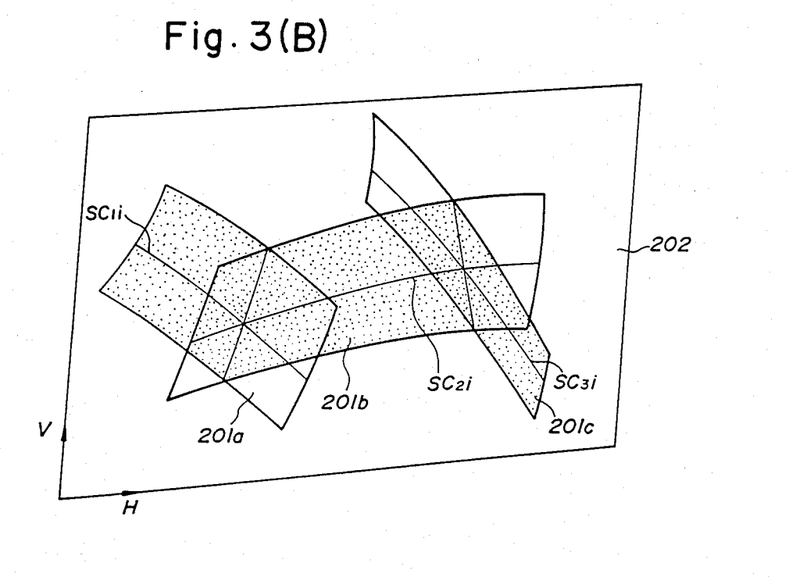
Figure 4C:
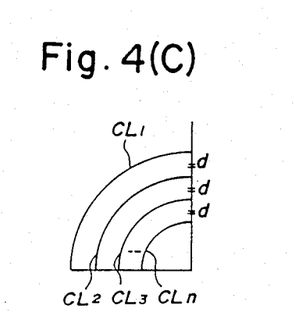

Further, in a case where the sections are mutually concentric cylinders perpendicular to the X-Y plane and, moreover, the spacing between adjacent sections is constant, the lines of intersection $CL_i (i=1, 2, 3, \ldots)$ between the sections and the X-Y plane are concentric circular arcs, as shown in FIG. 4(C). In such case, therefore, data are inputted specifying the first line of intersection $CL_1$, and the distance d between two mutually adjacent lines of intersection is also inputted. If the lines of intersection shown in FIG. 4(A) and the rule are inputted, the three-dimensional curved surfaces $201a$–$201c$ are cut by a predetermined plane 202 [see FIG. 3(B)] specified by one of the lines of intersection and the rule. The section curves that result are $SC_{1i}$, $SC_{2i}$, $SC_{3i}$, . . . and so on.

Figure 5:
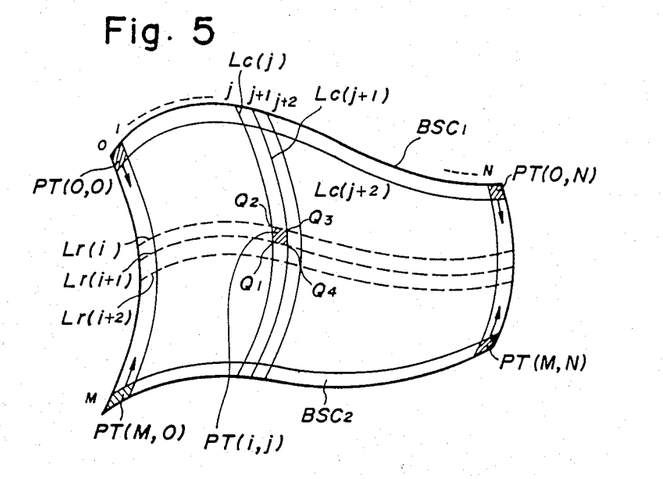

(c) When these data have been entered, the processor 102 generates each of the three-dimensional curved surfaces $201a$–$201c$ by a well-known method. As shown in FIG. 5, let $L_c(j)$ express an intermediate section curve containing a j-th dividing point on a base curve $BSC_1$ of a generated three-dimensional curved surface, and let $L_r(i)$ express a curve obtained by connecting an i-th dividing point on each of the intermediate section curves $L_c(j)$ $(j=1, 2, 3, \ldots n)$. A quadrilateral bounded by curves $L_c(j)$, $L_c(j+1)$, $L_r(i)$ and $L_r(i+1)$ shall be referred to as a "patch" PT $(i, j)$. The four vertices Q1, Q2, Q3, Q4 of the patch PT $(i, j)$ are generated by the well-known curved surface creation processing described above and are stored in the curved surface memory 106.

When the processing for generating each curved surface in accordance with step (c) is completed, processing for creating a complex curved surface begins, as follows:

(d) First, the operation $1 \to i$ is performed.

(e) Next, the operation $1 \to j$ is performed.

(f) The processor 102 then obtains a line of intersection $CL_i$ on the i-th X-Y plane by using the data indicative of the 1st line of intersection and the spacing between the lines of intersection obtained in step (b).

(g) When the i-th line of intersection $CL_i$ has been found, the processor 102 finds the points of intersection between the i-th line of intersection $CL_i$ and the sides of projection patches, which are obtained by projecting each patch (see FIG. 5) of the j-th three-dimensional curved surface onto the X-Y plane.

Figure 6:
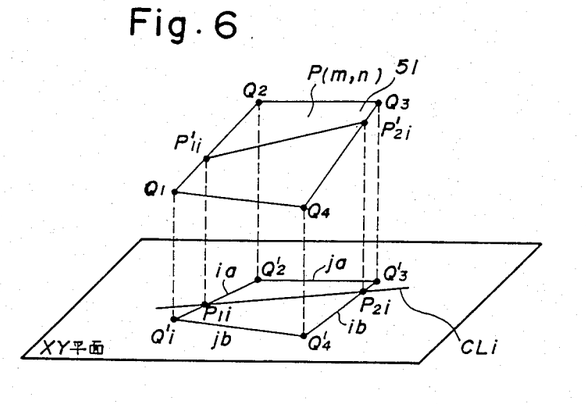

(h) When the coordinates of all points of intersection between the sides of several projection patches and the i-th line of intersection $CL_i$ have been obtained, the coordinates of points on the j-th three-dimensional curved surface corresponding to these points of intersection are computed. Specifically, the coordinates of the points on the j-th curved surface, which points are obtained by projecting the points of intersection onto the X-Y plane, are found. FIG. 6 is a view for describing a method of computing the coordinates of the points on the curved surface. Four sides $i_a$, $i_b$, $j_a$, $j_b$ are obtained by projecting a predetermined patch P $(m, n)$ on a three-dimensional curved surface onto the X-Y plane. Let $P_{1i}$, $P_{2i}$ represent the points of intersection between the i-th line of intersection $CL_i$ and a predetermined two of these four sides, and let $(x_{1i}, y_{1i})$, $(x_{2i}, y_{2i})$ represent the coordinates of these points of intersection. Further, let $Q_1'$, $Q_2'$ denote the end points of the side $i_a$ intersected by the line of intersection $CL_i$, let $Q_3'$, $Q_4'$ denote the end points of the side ib intersected by the line of intersection $CL_i$, let $Q_i$ $(i=1$–$4)$ represent the points on the three-dimensional curved surface that correspond to the points $Q_i'$ $(i=1$–$4)$, and let $(x_i, y_i, z_i)$ denote the coordinates of each of the points $Q_i$. Then, the Z coordinates $z_{1i}$, $z_{2i}$ of the points $P_{1i}'$, $P_{2i}'$ on the curved surface that correspond to the points of intersection $P_{1i}$, $P_{2i}$ are calculated in accordance with the following equations:

$$z_{1i} = z_1 + (z_2 - z_1)(x_{1i} - x_1)/(x_2 - x_1)$$

$$z_{2i} = z_3 + (z_4 - z_3)(x_{2i} - x_3)/(x_4 - x_3)$$

The coordinates of the points on the curved surface will be $(x_{1i}, y_{1i}, z_{1i})$, $(x_{2i}, y_{2i}, z_{2i})$.

The coordinates of points on the j-th three-dimensional curved surface that correspond to all of the points of intersection are found through the foregoing procedure and these coordinates are stored in the curve surface memory 106. This will provide a section curve $SC_{ji}$ obtained when the j-th three-dimensional curved surface is cut by a section corresponding to the i-th line of intersection CL.

(i) Next, the processor 102 checks whether the section curves for all three-dimensional curved surfaces have been obtained.

Figure 3C:
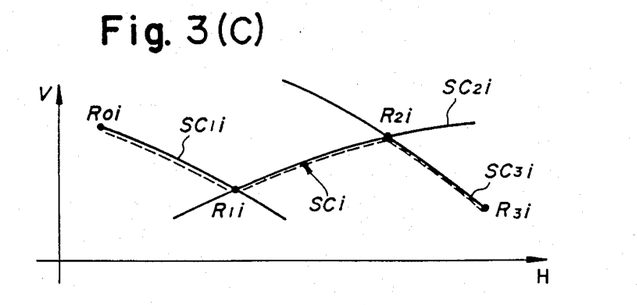

(j) If the section curves $[SC_{1i}, SC_{2i}, SC_{3i}, \ldots$ in FIGS. 3(B), (C)] of all three-dimensional curved surfaces have not been obtained, the operation $j+1 \to j$ is performed and the processing from step (g) onward is repeated.

(k) If the section curves $(SC_{1i}, SC_{2i}, SC_{3i}, \ldots)$ of all three-dimensional curved surfaces have been obtained, on the other hand, the section curve SCi [see the dashed line in FIG. 3(C)] of the complex curved surface 201 is found through the following processing: Specifically, a point of intersection $R_{ji}$ $(j=1, 2, 3 \ldots)$ between the section curve $SC_{ji}$ and a section curve $SC_{(j+1)i}$ $(j=1, 2, 3, \ldots)$ is calculated. When a point of intersection Rji $(j=1, 2, \ldots)$ has been found as set forth above, a section curve $SC_i$ corresponding to the i-th line of intersection $CL_i$ is specified by a section curve $SC_{1i}$ between points of intersection $R_{0i}$, $R_{1i}$, a section curve $SC_{2i}$ between points of intersection $R_{1i}$, $R_{2i}$, and a section curve $SC_{3i}$, . . . between points of intersection $R_{2i}$, $R_{3i}$.

(m) When the section curve $SC_i$ has been found, it is checked whether section curves corresponding to all lines of intersection $CL_i$ have been obtained.

(n) If section curves corresponding to all lines of intersection have not been obtained, the operation $i+1 \to i$ is performed and processing from step (e) onward is repeated.

(p) If section curves corresponding to all lines of intersection have been obtained, however, the processing for creating the complex curved surface ends.

(B) Rounding Processing

If it is required to insert a fillet surface of radius R, rounding processing in accordance with the flowchart shown in FIG. 7 is executed after the section curve $SC_i$ has been obtained by the above-described processing, or after all of the section curves $SC_i$ $(i=1, 2, \ldots)$ have been obtained to conclude complex curved surface creation processing. Rounding processing according to the present invention basically includes (i) a step of deciding the radius R' of the circular arc inserted at the intersection, and (ii) a step of inserting the circular arc of radius R' at the intersection.

(1) The normal vectors $V_1$, $V_2$ of the first and second curves 11, 12 at the point of intersection $P_0$ (see FIG. 1) are calculated.

(2) Next, the angle θ defined by $V_1 \times V_2$ and the normal vector V of the section 13 perpendicular to the XY plane cutting the complex curved surface is calculated.

(3) If rounding of radius R is commanded and θ has been obtained, the processor 102 calculates the radius R' of the circular arc, which is to be inserted at the intersection, in accordance with the equation $$R'' = (1 + 1/|\cos \theta|) \cdot R/2 \qquad (1)$$

The reason for deciding the radius R of the circular arc by the foregoing Eq. (1) will now be described.

Figure 8A:
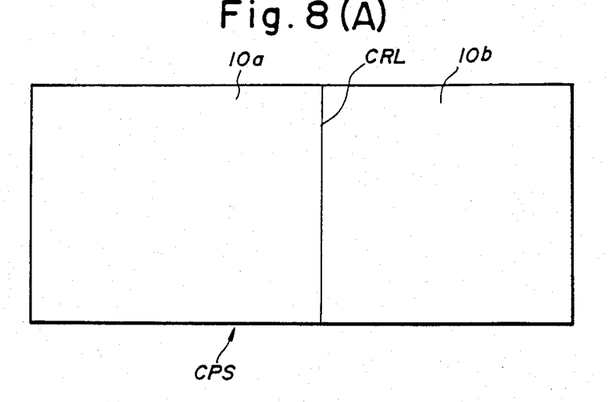
FIGS. 8a, 8b, 9 are explanatory views for deciding the radius of an inserted circular arc according to the present invention.
Figure 8B:
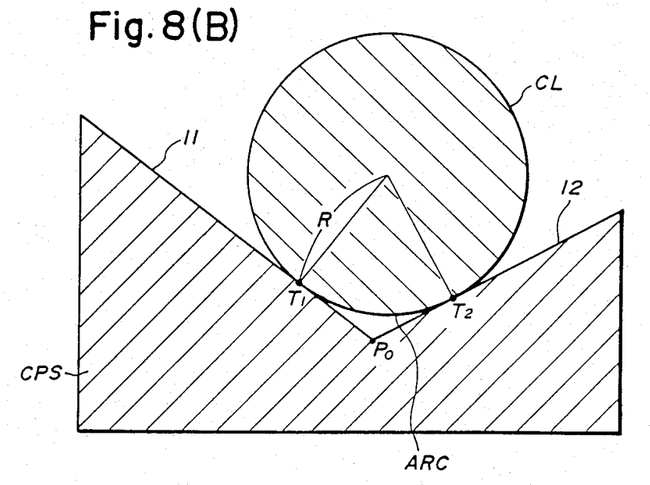

If the line of intersection CRL between the first and second curved surfaces 10a, 10b constituting the complex curved surface CPS is parallel to the XY plane, as shown in the plan view of FIG. 8(A), the circular cylinder of radius R is disposed along the line of intersection CRL and the complex curved surface and cylinder are cut by the section perpendicular to both the XY plane and line of intersection CRL, the sectional face of the circular cylinder will be as shown by the shaded portion in FIG. 8(B).

More specifically, if the central axis of the circular cylinder CL is parallel to the line of intersection CRL, then the sectional face of the circular cylinder CL will be a true circle, and the first and second section curves 11, 12 will lie tangent to the circle at the points $T_1$, $T_2$.

Accordingly, if it is desired to insert roundness of radius R at this portion where the first and second curved surfaces 10a, 10b intersect, (a) the tool is moved along the first curve 11 to the point of tangency $T_1$;

(b) the tool is then moved along the circular arc ARC of radius R from the point of tangency $T_1$ to the point of tangency $T_2$; and (c) the tool is finally moved along the second curve 12 from the point of tangency $T_2$.

The foregoing is for a case where the line of intersection CRL lies parallel to the XY plane. If the line of intersection CRL is not parallel to the XY plane, however, as shown in the front view of FIG. 9, the circular cylinder CS is cut obliquely when cut by the section perpendicular to the XY plane. Consequently, the sectional face of the circular cylinder is an ellipse and not a true circle [see FIG. 1(C)].

Figure 9:
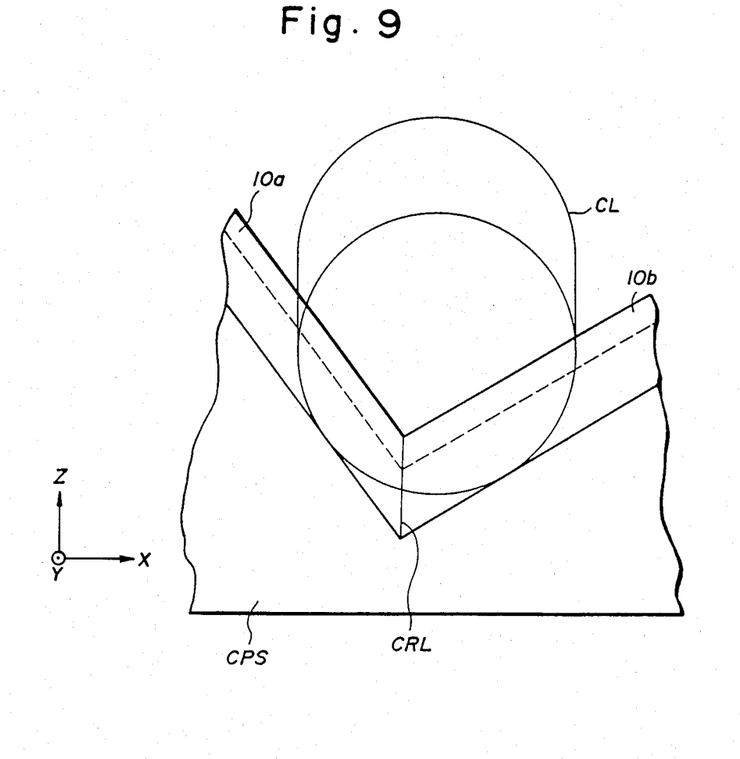

Accordingly, if it is desired to insert roundness of radius R at the portion where the first and second curved surfaces 10a, 10b intersect, (a) the tool is moved along the first curve 11 to the point of tangency $T_3$;

(b) the tool is then moved along the outer form ELP of the ellipse from the point of tangency $T_3$ to the point of tangency $T_4$; and (c) the tool is finally moved along the second curve 12 from the point of tangency $T_4$.

However, control for moving the tool along the outer form ELP of the ellipse is difficult. Accordingly, in the present invention, the radius R' of the circular arc to be inserted at the intersection is obtained in accordance with Eq. (1) (a) When the line of intersection CRL is parallel to the XY plane (i.e. when θ=0), the circular arc of radius R is inserted as commanded. (b) If the line of intersection is not parallel to the XY plane, then the circular arc whose radius is the average value of the major axis ($=R/|\cos \theta|$) and minor axis ($=R$) of the ellipse is inserted.

The foregoing is the processing for deciding the radius of the circular arc inserted at the portion of intersection.

Figure 10:
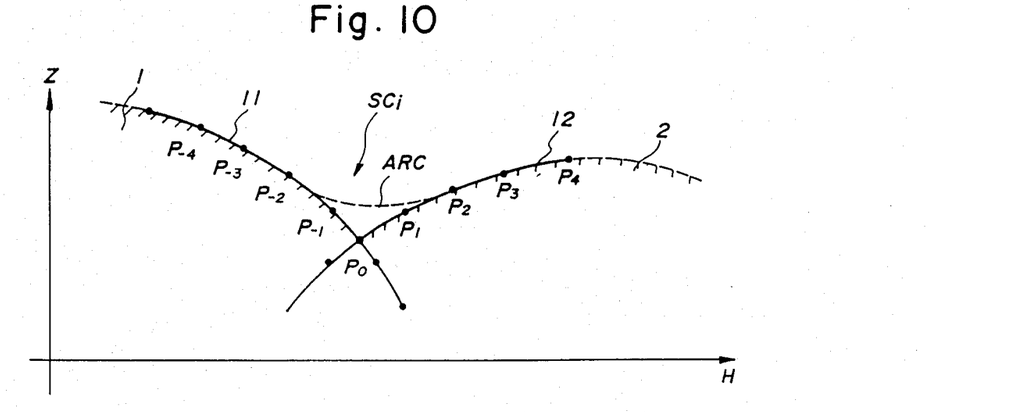
FIGS. 10, 11a-11d are views for describing circular arc insertion processing.

When the radius of the circular arc inserted at the portion of intersection has thus been decided, the processor inserts the circular arc through the processing described hereinbelow. The first and second curves (section curves) 11, 12 are approximated by straight lines, as shown in FIG. 10. Also, let straight line approximation points located one after another from the point of intersection $P_0$ to the starting point of the first curve 11 be denoted by $P_i (i=0, -1, -2, \ldots)$, and let straight line approximation points located one after another from the point of intersection $P_0$ to the end point of the second curve 12 be denoted by $P_j (j=0, 1, 2, \ldots)$.

(4) First, the operations $0 \to i$, $0 \to j$ are performed.

(5) Next, the operations $P_i \to P_{-S}$, $R_{i-1} \to R_{-E}$ are performed, and then the operations $P_j \to P_S$, $R_{j+1} \to P_E$.

(6) Thereafter, the distance D between the point $P_{-S}$ and the point $P_S$ is found, then D and $2 \cdot R'$ are compared in terms of magnitude.

(7) If $D > 2.R'$ holds, rounding of radius R' is deemed impossible and rounding processing is terminated.

(8) If $D \leq 2.R'$ holds, on the other hand, points of tangency $P_{-T}$, $P_T$ at which the two straight lines $P_{-S}P_{-E}$ and $P_S P_E$ are tangent to a circle of radius R' are obtained (see FIG. 11). It should be noted that the straight line $P_{-S}P_{-E}$ referred to here means a straight line of infinite length passing through the points $P_{-S}$, $P_{-E}$. The same will hold for other straight lines hereinbelow.

(9) Next, it is determined whether the point of tangency $P_{-T}$ lies between $P_{-E} - P_0$. More specifically, it is determined whether $(P_{-E})_H \leq (P_{-T})_H$ holds, where $(P_{-E})_H$ represents the H-axis coordinate of the point $P_{-E}$ and $(P_{-T})_H$ represents the H-axis coordinate of the point $P_{-T}$.

Figures 11A, 11B:
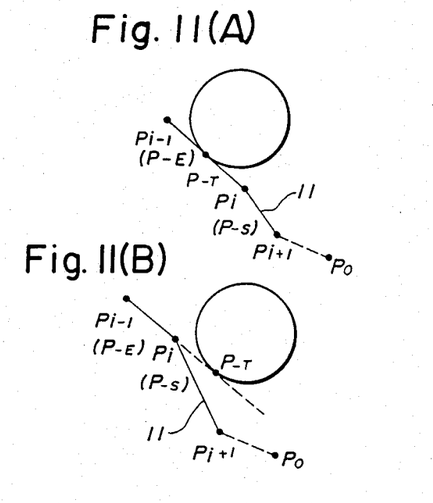

(10) If the point of tangency $P_{-T}$ lies between $P_{-E} - P_0$ [see FIG. 11(A) or (B)], then it is determined whether the point of tangency $P_T$ lies between $P_0 - P_E$, that is whether $(P_T)_H \leq (P_E)_H$ holds.

Figure 11C:
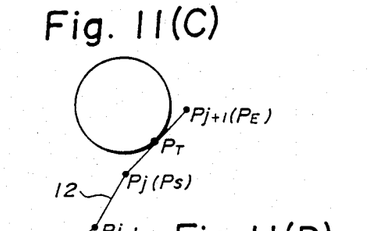
Figure 11D:
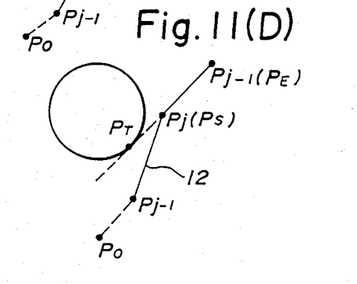

(11) If the point of tangency $P_T$ lies between $P_0 - P_E$ [see FIG. 11(C) or (D)], then it is determined whether the point of tangency $P_{-T}$ lies between $P_{-E} - P_{-S}$ [FIG. 11(A)] and whether the point of tangency $P_T$ lies between $P_S - P_E$ [FIG. 11(C)].

(12) If the points of tangency $P_T$, $P_{-T}$ are as shown in FIGS. 11(A), (C), respectively, then the following is taken as the path for rounding:

$$\ldots P_{i-1}P_{-T} \to P_{-T}P_T \to P_T P_{j+1} \to \ldots$$

If the points of tangency are as shown in FIGS. 11(A), (D), on the other hand, then the following is taken as the path for rounding:

$$\ldots P_{i-1}P_{-T} \to P_{-T}P_T \to P_T P_j \to P_j P_{j+1} \to \ldots$$

If the points of tangency are as shown in FIGS. 11(B), (C), then the following is taken as the path for rounding:

$$\ldots P_{i-1}P_i \to P_i P_{-T} \to P_{-T}P_T \to P_T P_{j+1} \to \ldots$$

If the points of tangency are as shown in FIGS. 11(B), (D), then the following is taken as the path for rounding:

$$\ldots P_{i-1}P_i \to P_i P_{-T} \to P_{-T}P_T \to P_T P_j \to P_j P_{j+1} \ldots$$

The foregoing completes rounding processing and is followed by execution of rounding processing for the next intersection.

(13) If the point of tangency $P_T$ is found not to lie between $P_0-P_E$ at step (7), then the operation $j+1 \to j$ is performed and processing from step (5) onward is repeated.

(14) If the point of tangency $P_{-T}$ is found not to lie between $P_{-E}-P_0$ at step (9), then it is determined whether the point of tangency $P_T$ lies between $P_0-P_E$, as in step (10).

(15) If $P_T$ lies between $P_0-P_E$, the operation $i-1 \to i$ is performed and processing from step (5) onward is repeated.

(16) If $P_T$ is found not to lie between $P_0-P_E$ at step (14), then the operations $j+1 \to j$, $i-1 \to i$ are performed and processing from step (5) onward is repeated.

When rounding processing has been performed for all section curves $SC_i$ ($i=1, 2, \ldots$) in the above manner, processing for creating a complex curved surface having a fillet surface at the boundary of mutually adjacent three-dimensional curved surfaces ends.

The foregoing is processing for inserting a circular arc at the portion of intersection.

(C) Complex Curved Surface Data Processing

When creation of the complex curved surface subjected to rounding processing ends, the processor 102 outputs the complex curved surface data to the external storage medium 108 via the output unit 107 whenever required. Alternatively, the processor uses the complex curved surface data to create an NC program for machining the complex curved surface and then outputs the program to the memory 106 or external storage medium 108.

In accordance with the present invention described above, a circular arc of radius R is inserted at an intersection, in accordance with a command, when the line of intersection CRL between two curved surfaces lies parallel to the XY plane. If the line of intersection is not parallel to the XY plane, then a circular arc whose radius is the average value of the major axis ($=R/|\cos\theta|$) and minor axis ($=r$) of an ellipse is inserted at the intersection. Rounding can thus be performed simply and accurately.

We claim:

1. A method of creating a complex curved machining surface in which a rounded section curve is provided where first and second curved machining surfaces intersect, comprising the steps of:

obtaining normal vectors $V_1$, $V_2$ of the first and second curved machining surfaces at a point of intersection $P_0$ of first and second section curves obtained when said first and second curved machining surfaces are cut by a section perpendicular to the XY plane, when the normal vectors originate at the point of intersection $P_0$ of the first section curve, the second section curve and the perpendicular section;

calculating an angle $\theta$ defined by $V_1 \times V_2$ and a normal vector V of said perpendicular section;

calculating $R'$ in accordance with the equation $$R' = (1 + 1/|\cos\theta|) R/2$$

when a rounded section curve of radius R is desired;

inserting a circular arc of radius $R'$ where the first and second curved machining surfaces intersect; and machining the complex curved machining surface.

2. A complex curved machining surface creation method according to claim 1, wherein a point of intersection of the first and second curves is denoted by $P_0$, straight line approximation points located one after another from the point of intersection $P_0$ to a starting point of the first curve are denoted by $P_i$ ($i=0, -1, -2, \ldots$) straight line approximation points located one after another from the point of intersection $P_0$ to an end point of the second curve are denoted by $P_j$ ($j=0, 1, 2, \ldots$), and said step of inserting comprises:

performing operations of setting $P_{-S}=P_i$, $P_{-E}=P_{i-1}$, $P_S=P_j$ and $P_E=P_{j+1}$ (where i, j each have an initial value of 0), and obtaining points of tangency $P_{-T}$, $P_T$ at which two straight lines $P_{-S}P_{-E}$ and $P_S P_E$ are tangent to a circle of radius R, where $P_S$, $P_E$, $P_{-S}$ and $P_{-E}$ are end points of the straight lines;

determining whether the points of tangency $P_{-T}$, $P_T$ lie between $P_{-E}-P_0$ and $P_0-P_E$, respectively;

designating a circular arc $P_{-T}P_T$ as the rounded section curve inserted at the intersection if the points of tangency $P_{-T}$, $P_T$ lie between $P_{-E}-P_0$, and executing the steps of performing, determining and designating, with the operation of setting $i=i-1$ being performed if $P_{-T}$ does not lie between $P_{-E}-P_0$ and the operation of setting $j=j+1$ being performed if $P_T$ does not lie between $P_0-P_E$.

3. A complex curved machining surface creation method according to claim 2, wherein said step of executing includes:

calculating a distance D between $P_{-S}$ and $P_S$; and determining whether said distance D is greater than $2 \cdot R'$ and, if D is greater than $2 \cdot R'$, indicating that rounding having the radius R is impossible to perform.

4. A complex curved machining surface creation method according to claim 3, wherein said step of designating includes:

determining whether the point of tangency $P_{-T}$ lies between $P_{-E} \cdot P_{-S}$ and whether the point of tangency $P_T$ lies between $P_S-P_E$;

designating line segment $P_{i-1}P_{-T}$, arc $P_{-T}P_T$ and line segment $P_T P_{j+1}$ as the complex curved machining surface if the points of tangency $P_{-T}$, $P_T$ lie between $P_{-E}-P_{-S}$ and between $P_E-P_S$, respectively;

designating line segment $P_{i-1}P_{-T}$, arc $P_{-T}P_T$, line segment $P_T P_j$ and line segment $P_j P_{j+1}$ as the complex curved machining surface if the point of tangency $P_{-T}$ lies between $P_{-E}-P_{-S}$ and the point of tangency $P_T$ does not lie between $P_E-P_S$;

designating line segment $P_{i-1}P_i$, line segment $P_i P_{-T}$, arc $P_{-T}P_T$ and line segment $P_T P_{j+1}$ as the complex curved machining surface if the point of tangency $P_{-T}$ does not lie between $P_{-E}-P_{-S}$ and the point of tangency $P_T$ lies between $P_E-P_S$; and designating line segment $P_{i-1}P_i$, line segment $P_i P_{-T}$, arc $P_{-T}P_T$, line segment $P_T P_j$ and line segment $P_j P_{j+1}$ as the complex curved machining surface if the points are tangency $P_{-T}$, $P_T$ do not lie between $P_{-E}-P_{-S}$ and between $P_E-P_S$, respectively.

* * * * *

UNITED STATES PATENT AND TRADEMARK OFFICE
CERTIFICATE OF CORRECTION

PATENT NO. : 4,855,927

DATED : Aug. 8, 1989

INVENTOR(S) : Masaki Seki et al.

It is certified that error appears in the above-identified patent and that said Letters Patent is hereby corrected as shown below:

Col. 1, line 51, after "in" insert --a--;

line 56, after "surfaces" insert --.--;

line 57, before "includes" insert a paragraph indention and --In brief, the proposed method of creating complex curved surfaces--.

Col. 2, line 15, "or" s/b --of--;

line 27, "$V_1$, $V_2$" s/b --$\vec{V}_1$, $\vec{V}_2$--;

line 32, "$V_1 \times V_2$" s/b --$\vec{V}_1 \times \vec{V}_2$--, "V" s/b --$\vec{V}$--;

line 35, change "$R'=(1+1/|\cos\theta|)R/2$" to --$R'=(1+1/|\cos\theta|)\cdot R/2$--;

line 44, "FIGS. 1A-1C are explanatory views" s/b --FIG. 1 is an explanatory view--;

line 48, "FIGS. 3a-c, 4a-c, 5 and 6" s/b --FIGS. 3 through 6--;

UNITED STATES PATENT AND TRADEMARK OFFICE
CERTIFICATE OF CORRECTION

PATENT NO. : 4,855,927

DATED : Aug. 8, 1989

INVENTOR(S) : Masaki Seki et al.

Figure 7A:
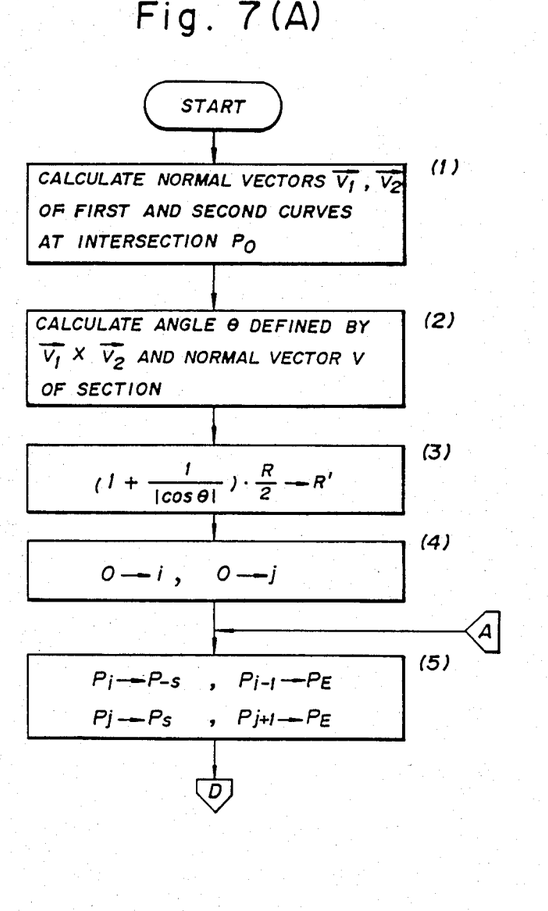
FIGS. 7a-7b are flowcharts of rounding processing according to the present invention.
Figure 7B:
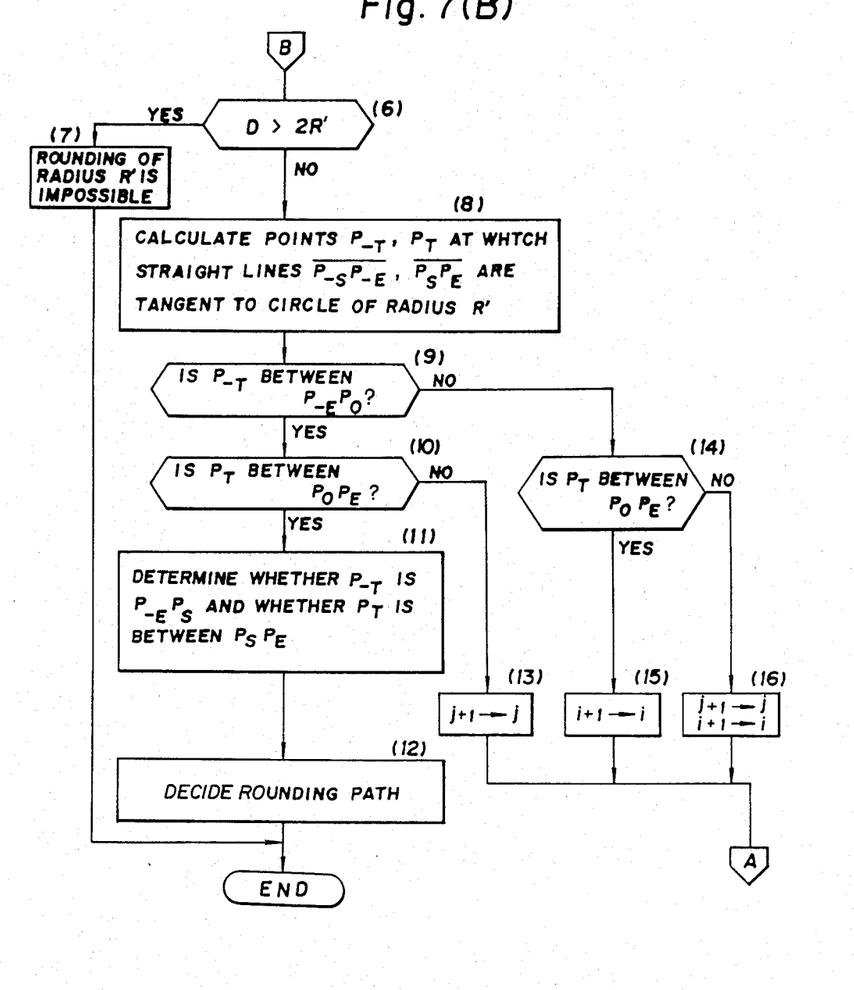

It is certified that error appears in the above-identified patent and that said Letters Patent is hereby corrected as shown below:

line 51, "FIGS. 7a-7b are flowcharts" s/b --FIG. 7 is a flowchart--;

line 53, "FIGS. 8a, 8b, 9" s/b --FIGS. 8 and 9--;

line 55, "FIGS. 10, 11a-11d" s/b --FIGS. 10 and 11--.

Col. 3,   line 2, "$V_1$" s/b --$\vec{V_1}$--;

line 4, "$V_2$" s/b --$\vec{V_2}$--;

line 5, "V" s/b --$\vec{V}$--;

line 48, "$V_1$, $V_2$" s/b --$\vec{V_1}$, $\vec{V_2}$--;

line 53, "V" s/b --$\vec{V}$--.

Col. 5,   line 66, "ib" s/b --$i_b$--.

Col. 6,   line 66, "$V_1$, $V_2$" s/b --$\vec{V_1}$, $\vec{V_2}$--.

Col. 7,   line 1, "$V_1$ X $V_2$" s/b --$\vec{V_1}$ X $\vec{V_2}$--;

line 8, "R"" s/b --R'--;

UNITED STATES PATENT AND TRADEMARK OFFICE
CERTIFICATE OF CORRECTION

PATENT NO. : 4,855,927

DATED : Aug. 8, 1989

INVENTOR(S) : Masaki Seki et al.

It is certified that error appears in the above-identified patent and that said Letters Patent is hereby corrected as shown below:

line 61, after "(1)" insert --.--;

Col. 8,   line 17, "$R_{i-1} \rightarrow R_{-E}$" s/b --$P_{i-1} \rightarrow P_{-E}$--;

line 18, "$R_{j+1} \rightarrow P_E$" s/b $P_{j+1} \rightarrow P_E$--;

line 24, "$\leqq$" s/b --$\leq$--, "2.R" s/b --2·R--;

line 34, "$\leqq$" s/b --$\leq$--;

line 41, "$\leqq$" s/b --$\leq$--;

line 50, "$\ldots P_{i-1}P_{-T} \rightarrow P_{-T}P_T \rightarrow P_T P_{j+1} \rightarrow \ldots$" s/b --$\ldots \overline{P_{i-1}P_{-T}} \rightarrow \overparen{P_{-T}P_T} \rightarrow \overline{P_T P_{j+1}} \rightarrow \ldots$;

line 58, "$P_{i-1}P_{-T} \rightarrow P_{-T}P_T \rightarrow P_T P_j \rightarrow P_j P_{j+1} \rightarrow \ldots$" s/b --$\ldots \overline{P_{i-1}P_{-T}} \rightarrow \overparen{P_{-T}P_T} \rightarrow \overline{P_T P_j} \rightarrow \overline{P_j P_{j+1}} \rightarrow \ldots$--;

line 62, "$\ldots P_{i-1}P_i \rightarrow P_i P_{-T} \rightarrow P_{-T}P_T \rightarrow P_T P_{j+1} \rightarrow \ldots$" s/b --$\ldots \overline{P_{i-1}P_i} \rightarrow \overline{P_i P_{-T}} \rightarrow \overparen{P_{-T}P_T} \rightarrow \overline{P_T P_{j+1}} \rightarrow \ldots$--;

line 69, "$\ldots P_{i-1}P_i \rightarrow P_i P_{-T} \rightarrow P_{-T}P_T \rightarrow P_T P_j \rightarrow P_j P_{j+1} \ldots$" s/b --$\ldots \overline{P_{i-1}P_i} \rightarrow \overline{P_i P_{-T}} \rightarrow \overparen{P_{-T}P_T} \rightarrow \overline{P_T P_j} \rightarrow \overline{P_j P_{j+1}} \ldots$--.

Col. 9,   line 60, "$V_1 \times V_2$" s/b --$\vec{V_1} \times \vec{V_2}$--;

UNITED STATES PATENT AND TRADEMARK OFFICE
CERTIFICATE OF CORRECTION

PATENT NO. : 4,855,927

DATED : Aug. 8, 1989

INVENTOR(S) : Masaki Seki et al.

It is certified that error appears in the above-identified patent and that said Letters Patent is hereby corrected as shown below:

line 61, "V" s/b --$\vec{V}$--.

Col. 10,  line 19, "R," s/b --R'--;

line 44, "$P_{-E}`P_{-S}$" s/b --$P_{-E}-P_{-S}$--;

<u>In the Abstract</u> line 8, "$V_1, V_2$" s/b --$\vec{V_1}, \vec{V_2}$--;

line 13, "$V_1, V_2$" s/b --$\vec{V_1}, \vec{V_2}$--.

Signed and Sealed this

Twenty-sixth Day of November, 1991

Attest:

HARRY F. MANBECK, JR.

*Attesting Officer*          *Commissioner of Patents and Trademarks*